INVENTOR.
Myron V. Kalfaian

Dec. 22, 1953 M. V. KALFAIAN 2,663,756

SYNCHRONIZATION IN COLOR TELEVISION

Filed July 11, 1951 4 Sheets-Sheet 2

INVENTOR.

Myron V. Kalfaian

Dec. 22, 1953 M. V. KALFAIAN 2,663,756

SYNCHRONIZATION IN COLOR TELEVISION

Filed July 11, 1951 4 Sheets-Sheet 3

INVENTOR.

Migran V. Kalfaian

Dec. 22, 1953 M. V. KALFAIAN 2,663,756

SYNCHRONIZATION IN COLOR TELEVISION

Filed July 11, 1951 4 Sheets-Sheet 4

SYNCHRONIZING PULSES

PHASE MODULATOR OF SYNC-PULSES

INVENTOR.

Myron V. Kalfaian

Patented Dec. 22, 1953

2,663,756

UNITED STATES PATENT OFFICE 2,663,756

SYNCHRONIZATION IN COLOR TELEVISION

Meguer V. Kalfaian, Los Angeles, Calif.

Application July 11, 1951, Serial No. 236,262

4 Claims. (Cl. 178—5.2)

This invention relates to color television, and more particularly to provide improved methods and means for the transmission and reception of picture synchronizing signals over phase modulation of the carrier wave, whereby to provide greater accuracy in synchronization than is possible by the presently standardized amplitude modulated serrated wave form. For example, in one mode of operation at the receiving end, the horizontal synchronizing pulses are separated from the vertical pulses by a local oscillator (operating at line frequency of 15,750 cycles per second), both the phase and frequency of which are controlled by the incoming horizontal pulses. While the incoming regular pulses are capable of aligning the phase and frequency of the oscillator automatically, a survey of the operating performance of the existing sets shows that these oscillators must be almost-accurately tuned in resonance to the above frequency, and be free of frequency drift. Even the most expensive sets seem to require such tuning adjustment frequently; as from time to time the reproduced picture becomes jittery and wavy. The separation of vertical sync pulses is achieved by integrating with a resistance-capacitance network having a definite time constant suitable for eliminating the horizontal pulses. The output wave of this circuit has a slowly rising serrated wavefront, the shape of which is inferior to the steep sided pulse in determining the exact time of triggering the vertical deflection oscillator, and therefore, carefully controlled operating conditions are frequently required. Another difficulty of synchronization arises from carrier fading, which reduces the amplitude of horizontal and vertical synchronizing pulses below the operating level.

The type of picture synchronization employed herein is contemplated to be used in conjunction with the system of color television, disclosed in my Patent No. 2,558,489, June 26, 1951. The system described utilizes double sideband modulation of a time-divided carrier wave, with simultaneous amplitude and phase modulation for multiplexing composite signals of the color images. Also, in order to avoid widely expanded sidebands that are usually associated with abruptly interrupted time-divisions of the carrier wave, in conjunction with phase modulation, special waveshaping of the carrier envelopes is employed in the system. To explain this waveshaping condition briefly, it is shown that when the carrier is interrupted abruptly at a time-dividing frequency $f_m$, and the modulation frequencies varied maximum to $f_m/2$, the sidebands would repeat successively in complementary pairs around the carrier, occupying frequency spaces between $f_c \pm f_m$, $f_c \pm 2f_m$, $f_c \pm 3f_m$ etc., with gradually diminishing amplitudes. Similarly, if the carrier had contained phase modulation, the time-period of each carrier-cycle would change from normal, and cause effective frequency modulation with corresponding swing of the sidebands. However, these repeated sidebands may be narrowed to the first pair by waveshaping the amplitude rise and fall of each time-divided envelope to the simple curve of the sine-squared function. Similarly, in order to avoid effective frequency modulation, the carrier phase may be shifted stepwise; changing abruptly at the boundaries of each envelope; provided that the carrier amplitude is held negligibly low at the boundaries, so as to avoid sudden transient effect between adjacent envelopes of the carrier.

The waveshape of the controlled type of time-divided modulation is shown in Fig. 1, wherein, video signals of the first primary color are conveyed over the peaks of the time-divided carrier envelopes; the video signals of the second primary color are conveyed over phase-advancing of the carrier wave in every second envelope, as represented by $\theta_1$, $\theta_3$, $\theta_5$ etc.; and the video signals of the third primary color are conveyed over phase-retarding of the carrier wave in every other second envelope, as represented by $\theta_2$, $\theta_4$ etc. In order to produce the wave in nearly the ideal waveform, the carrier is first produced independently in two separate channels, as at B and C, and both the phase angle of the carrier and waveshape of the envelope are presynthesized, in each channel by sampling method, and finally combined to obtain the wave as shown at A.

In order to utilize greater effective time of signal transmission, there is disclosed in the above mentioned patent a color-sequence switching system, which reverses the normal color sequence at random elemental intervals, depending upon which of the second and third primary colors is present for transmission. For example, in all color television systems, it is assumed that each image element will contain a maximum number of three primary color components. If it were the case that every one of the image elements had contained all the primary colors simultaneously, then the time allotted to convey these components in any color-system would be utilized at the maximum efficiency. However, such is not the case in color images, and in the major part of one image frame, the majority of elemental images will contain only one or two primary colors. Hence, the time allotted for conveying the missing primary colors will be completely wasted, and result in poor image definition. In order to utilize most of the time allotted for conveying the three primary color components, advantage is taken of the fact that, simultaneous amplitude and phase modulation will provide three-way selectivity of the video signals, for example, by assigning amplitude modulation to convey video components of the Green color; assigning phase modulation of the carrier wave in backward direction to convey video components of the Blue color; and assigning phase modulation of the carrier wave in forward direction to convey video components of the Red color. Then, by employing a color-sequence reversing switch, the sequence of video components of the Blue and Red colors may be changed at any random elemental scanning interval, to transmit whichever color component is present at that time. Of course, when during a time-element both the Blue and Red colors are present, and equally important in color value, then the color component assigned to that time-element will be transmitted.

In order to simplify detection of the phase modulated signals, without the necessity of a reference carrier at the receiving end, a novel method of phase modulation had been described in the above mentioned patent, wherein, phase angle of the carrier in each succeeding time-division is shifted representative of intelligence, by a difference-angle measurable from a preceding angle, whereby each preceding phase-change represents a reference angle to a succeeding step of phase change. Detection of this type of phase modulation is achieved by passing the incoming carrier wave through two separate circuits of dissimilar decrements, and comparing the dissimilar phase angles of their carrier outputs as a function of the original intelligence.

In the preferred embodiment of the invention, in order to distinguish between the phase modulated video signals and the phase modulated sync pulses, phase modulation of the carrier by video signals is limited to 72 degrees maximum, which is approximately the useful linear portion of the sine curve, and the carrier phase is shifted 90 degrees in either forward or backward direction representing the vertical and horizontal sync pulses. For even-line retrace, the carrier phase is shifted 90 degrees both in forward and vertical directions sequentially from envelope to envelope, representing simultaneous vertical and horizontal sync pulses. The phase discriminated sync pulses are then separated from the video signals by amplitude selectors, which may be any of the conventional types. It may be added here that, the system will operate on any type of interlace without necessitating changes or re-adjustment of any circuit components, since the system is independent of locally generated waves, or tuning of any circuit. Such a condition will provide pictures without jitter or waves. Similarly, due to the simultaneous color system, there will be no line crawl, and the picture will have good color texture.

Having described the various aspects of the invention, the following specification will be devoted to the details of one type of apparatus that may be employed in connection with the invention. In the drawings.

Since the present invention is to be used in conjunction with the modulation system described in my above mentioned patent issue, part description of same is included herein in order to clarify the substance thereof.

*Modulated waveshape of the carrier wave*

Figure 1:
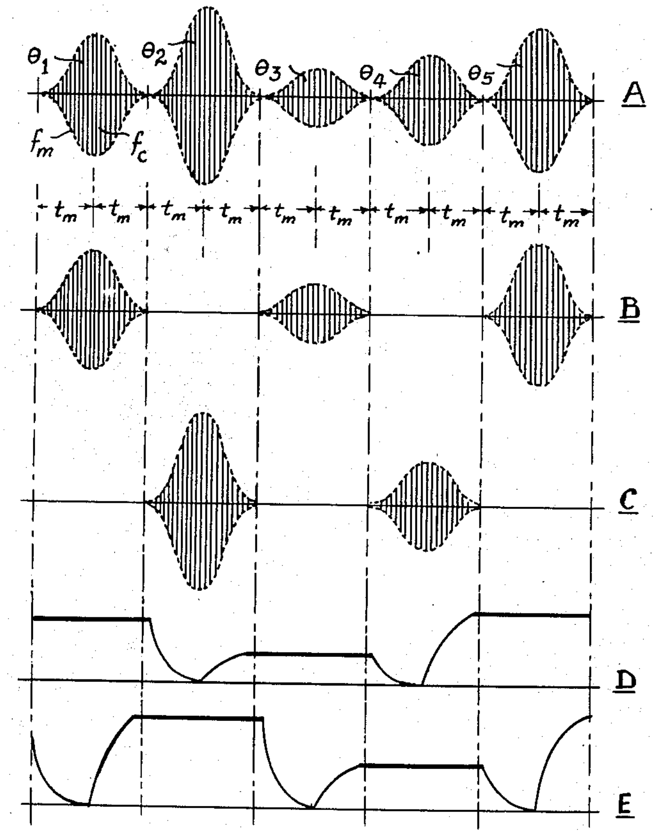
Fig. 1 illustrates the waveshape of the transmitted carrier envelopes, and the steps in which the carrier envelopes are produced.

The modulated waveshape of the carrier wave is shown in Fig. 1, at A. In order to adhere to the conditions in which the sidebands are limited to restricted regions, I have described by theory in my above mentioned patent issue, that the waveshape of amplitude rise and fall at the boundaries of individual carrier-envelope be that of the sine-squared function not to exceed the time period $t_m$, and that the carrier phase in each envelope be in a steady state step from boundary to boundary. Similarly, in order to avoid sudden phase shift of the carrier wave in dynamic condition, it is essential that the carrier power level at the boundaries of each envelope be zero, or negligibly low, whereby the carrier phase in each envelope may be different from the others without causing delaying action of phase resolution between the two phases of the carrier. Such an ideal, or nearly ideal waveshape of the carrier wave envelope is produced in periodic steps, as illustrated at B to E inclusive.

The carrier wave is produced in two separate channels, and the outputs of these two channels are gated in alternate sequence at the time dividing frequency, whereby during the quiescent period of each channel the carrier wave may be waveshaped and simultaneously amplitude and phase modulated, by sampling method, and finally the periodic outputs of the two channels are combined for final transmission. For example, at the output of the first channel the periodic carrier envelopes at B are produced, and at the output of the second channel the periodic carrier envelopes at C are produced. Then by combining the periodic carrier envelopes at B and C, the desired waveform as shown at A is obtained. The peak amplitudes of the periodic envelopes of the carrier wave at B are determined by the steady state sampled voltages shown at D, and the peak amplitudes of the periodic envelopes of the carrier wave at C are determined by the steady state sampled voltages shown at E. The manner in which the carrier phase in each envelope is shifted in a steady state step will be described by way of the transmitter shown in block diagram of Fig. 2.

*Phase and amplitude modulator*

For full detail of the simultaneous amplitude and phase modulator, in conjunction with the color-sequence switch, reference may be made to my above mentioned patent issue. However, the following description in connection with the transmitter block diagram in Fig. 2 will be sufficient to explain the function of the system.

Figure 2:
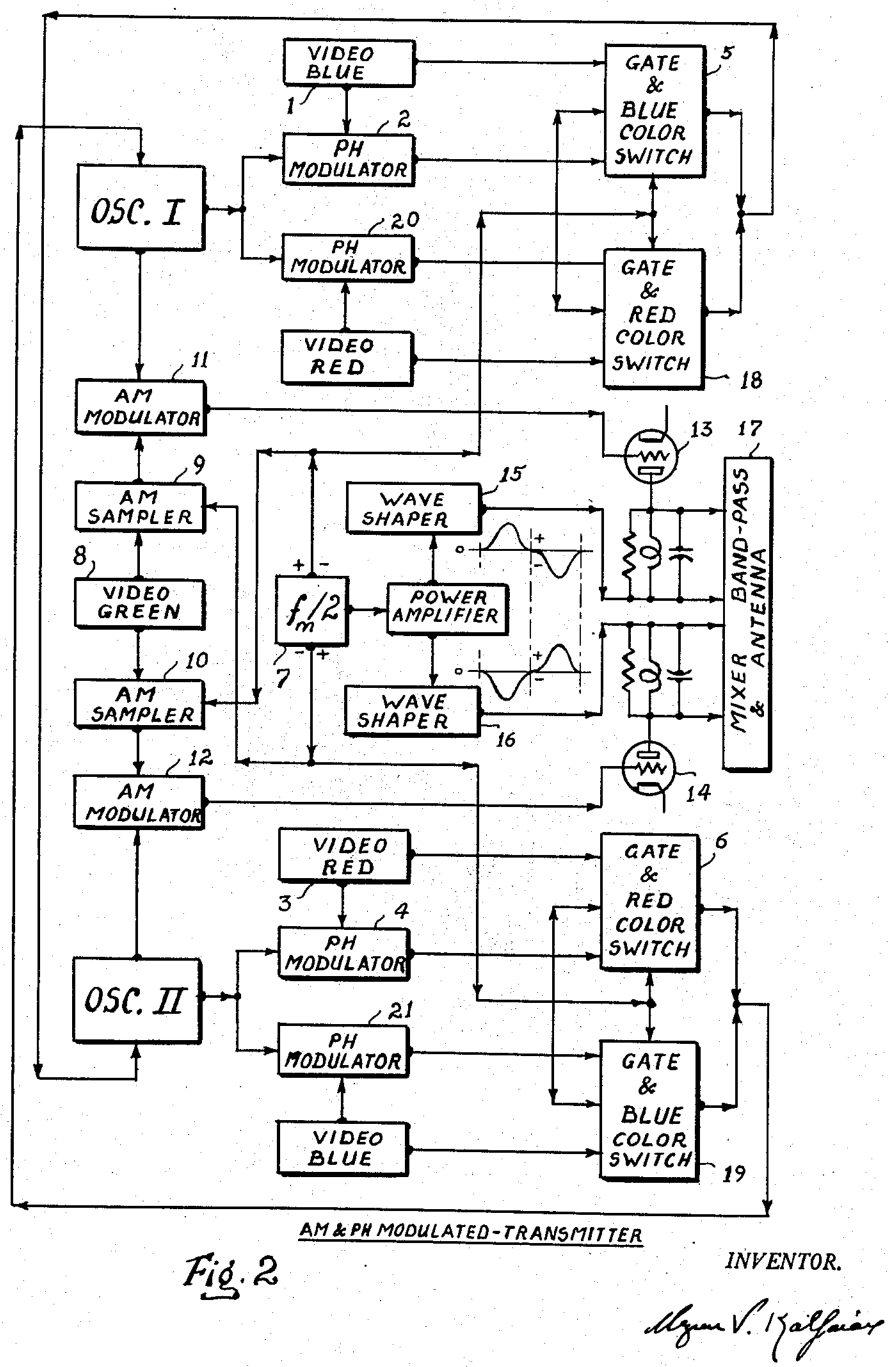
Fig. 2 illustrates a block diagram of the transmitter for video signal modulation.

In Fig. 2, the carrier wave is produced by two independent low Q oscillators I and II, both of which oscillate at the carrier frequency. The phase angle of oscillation I is shifted by video signals of the Blue primary color arriving from source 1 in phase-modulator 2, and the phase angle of oscillation II is shifted by video signals of the Red primary color arriving from source 3 in phase-modulator 4. The phase modulated oscillation of I in modulator 2 is applied upon the oscillator II through the gate 5, and the phase modulated oscillation of II in modulator 4 is applied upon the oscillator I through the gate 6. These gates consist of ordinary grid-controlled vacuum tubes, and their grid to cathode voltages are so biased that they are normally rendered inoperative, in order to normally prevent the oscillatory voltages of oscillators I and II acting upon each other for phase shifts. Block 7 represents a generator of the switching wave at frequency $f_m/2$, and it delivers alternate positive voltages upon the gates 5 and 6 for their operation in alternate sequence, so that oscillators I and II shift the phase angles of each other's oscillation in alternate intervals (at time division frequency $f_m$), by angles (representing signals of the Blue and Red primary colors) measurable from phase angles that the oscillations of oscillators I and II resolve in immediate preceding intervals. For example, assuming that during one positive half-cycle wave period of $f_m/2$, the gate 5 is operated and the oscillatory voltage of oscillator I is admitted to shift the phase angle of oscillation of oscillator II into an in-phase relation, the shifted phase of oscillation of II represents the normal phase of oscillation arriving from I in addition to the phase shift that represents the video signal of the Blue primary color. This operation reverses during the following positive half-cycle wave period of the switching generator 7, which at this time operates the gate 6 and the oscillatory voltage of oscillator II (phase modulated by the signals of the Red primary color) is applied upon the oscillator I to forcefully shift its oscillation into an in-phase relation. Thus it is seen that the output oscillations of oscillators I and II shift in steady state steps periodically with respect to each other by angles representative of the video Blue and Red primary colors measurable from infinitely changing reference angles of the carrier wave. To distinguish between the video signals of Blue and Red primary colors, the phase modulator 2 is arranged to retard the carrier phase of oscillator I, and the phase modulator 4 to advance the carrier phase of oscillator II.

For combined phase and amplitude modulation, the periodic steady state phase modulated portions of the oscillations of carrier oscillators I and II are further amplitude modulated in steady state steps by the video signals of Green primary color from source 8. The original video signals of Green primary colors from source 8 are sampled in AM-samplers 9 and 10 periodically (as shown at D and E in Fig. 1) in phase with the steady state phase modulated portions of the oscillators I and II, so that these periodic portions are simultaneously amplitude modulated in the AM-modulators 11 and 12, by the video Green signals. Thus, the outputs of modulators 11 and 12 contain simultaneous amplitude and phase modulated carrier, in alternate steady state steps at the time-division frequency rate. The outputs of these modulators are independently applied upon the grids of gate-and-amplitude modulator tubes 13 and 14, which are normally rendered inoperative. The plate voltages of these tubes are alternately supplied by the wave $f_m/2$, which is amplified and waveshaped, such as indicated by the waves next to the waveshaper blocks 15 and 16. These alternately variable plate voltages operate the modulator tubes during those periods in which the input carrier oscillations are modulated in steady state steps, and alternate envelopes of the carrier wave appear across the plate tank circuits of these tubes, which are then mixed in block 17, to obtain the carrier wave in the form as shown at A in Fig. 1.

For color switching, the signals of video Blue color retard the carrier phase, and the signals of video Red color advance the carrier phase, whereby these color signals may be automatically selected at the receiving end. For color-sequence switching, auxiliary gates 18 and 19, and phase modulators 20 and 21 are employed. The output of oscillator I besides being phase modulated by the normally assigned video components of Blue color, it is also phase modulated in auxiliary modulator 20 by the video components of the Red color. Similarly, the output of oscillator II besides being phase modulated by the normally assigned video components of Red color, it is also phase modulated in auxiliary modulator 21 by the video components of Blue color. When the video components of both Blue and Red colors are present, these auxiliary gates are inoperative, and the image components of Blue and Red colors are transmitted in regular sequence. However, when during an elemental scansion period one of these colors is absent, or below a negligible magnitude, the normally assigned gate becomes inoperative and the auxiliary gate operates, so that the other color component is transmitted instead; thus utilizing most all of the elemental scansion periods of transmission, which otherwise would be lost in regular sequential transmission.

*Phase modulated sync pulses*

Figure 3:
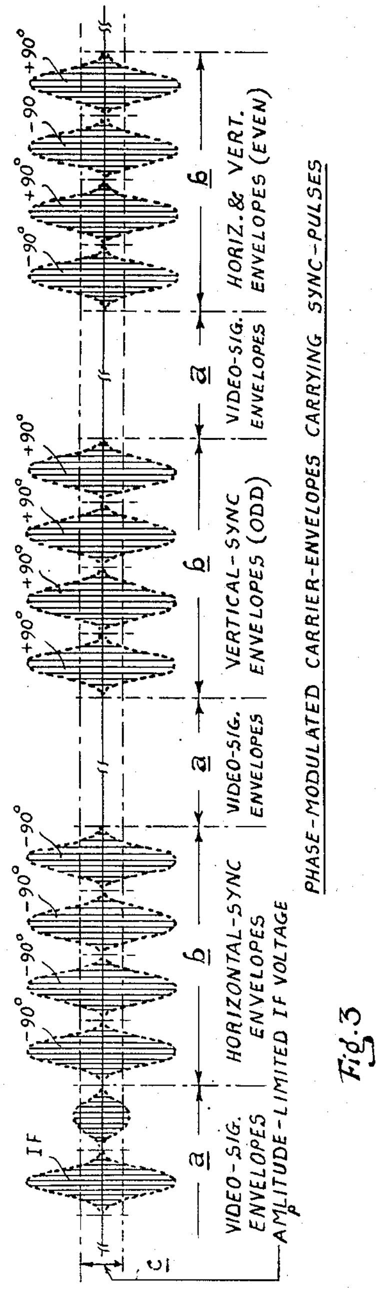
Fig. 3 illustrates how the carrier wave is phase modulated to represent synchronizing pulses.

In the drawing of Fig. 3, there is shown a waveform of the time-divided carrier envelopes, wherein, the time areas *a* are devoted to the conveyance of video signals, and the time areas *b* are devoted to the conveyance of synchronizing pulses. In the first section of areas *b*, the carrier phase is shifted 90 degrees backward in every succeeding envelope; representing the horizontal synchronizing pulse. In the second section of areas *b*, the carrier phase is shifted 90 degrees forward in every succeeding envelope; representing the vertical synchronizing pulse; for odd-line. And in the third section of areas *b*, the carrier phase is shifted backward and forward sequentially from envelope to envelope; representing simultaneous horizontal and vertical pulses; for even-line. The number of carrier envelopes during each synchronizing pulse is of no importance, but it is dependent upon the duration of the phase-modulating pulse at the transmitting end.

*Phase discriminator circuit for video-signals and for horizontal-vertical sync pulses*

In the first step of detecting the phase modulated carrier wave, the amplitude variation of the carrier envelopes are limited as indicated by the dot-and-dashed line c, in Fig. 3. When the carrier envelopes are thus limited in amplitude, the output will be (disregarding the narrow dips between the envelopes) as if the carrier were of constant amplitude, and that the phase angle were shifted abruptly in time-division steps. This type of phase modulation is detected by the discriminator circuit given in Fig. 4.

Figure 4:
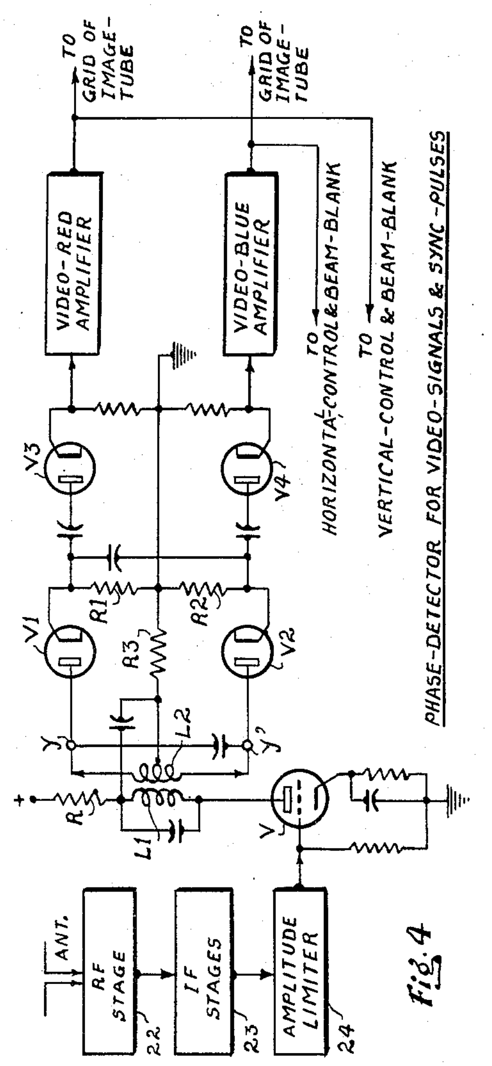
Fig. 4 illustrates a phase discriminator circuit for separating the video and synchronizing signals.

In Fig. 4, the incoming carrier wave is passed through the R. F. stage shown by block 22; passed through the I. F. stages shown by block 23; passed through an amplitude limiter, or multiple thereof, in the usual manner, shown by the block 24; and the output is applied upon the amplifier tube V. Due to the resistance R in the anode circuit of this tube, the I. F. voltage in this circuit will follow the abrupt phase changes of the input I. F. voltage faithfully. Whereas in the reactive circuit L1, the value of Q is so adjusted that, the time required for phase resolution from one abrupt state to another is one envelope-period. Accordingly, at the beginning of each carrier envelope there will be a phase difference of the I. F. voltage between R and L1, which is a function of the original intelligence. These phase differences of the I. F. voltages may then be discriminated, as follows:

The coupling of the secondary coil L2 is adjusted slightly less than the value of critical coupling, whereby the voltage in the secondary is in quadrature with respect to the primary coil L1. The diodes V1 and V2 are connected to the terminals $y$ and $y'$ of coil L2, in a manner that, the output voltages across R1 and R2 are the differences of the rectified outputs of the individual diodes. When the voltage across R is applied upon the resistance R3, as shown, then the rectified output voltages across R1 and R2 will vary with variation of the phase angle between voltages across R and L2. That is, when the voltage-phase across R and L2 is in quadrature, the output voltages across R1 and R2 are of equal and constant amplitude. Whereas, when the voltage-phase across L2 shifts such that, the positive half-cycles across R3 add to the positive half-cycles at $y$, by greater amount than at $y'$, then the rectified voltage across R1 will be greater than the voltage across R2. And when the positive half-cycles across R3 add to the positive half-cycles at $y'$ by greater amount than at $y$, then the rectified voltage across R2 will be greater than the voltage across R1. Thus, selective voltages across R1 and R2 may be obtained by shifting the carrier phase, forward or backward, from envelope to envelope at the transmitting end. For complete selection of the color-video signals, the voltages across R1 and R2 are further rectified by diodes V3 and V4, the outputs of which are independently amplified for final color-image reproduction, as shown in the drawing. Actually however, the diodes V3 and V4 are not necessary if the video amplifiers are of the resistance-capacitance coupled type, as only the positive signals across R1 and R2 are utilized in exciting the normally cut-off biased control grids of the tri-color image reproducing tube.

As stated in the foregoing, up to 72 degrees of phase modulation of the carrier is devoted to signal transmission, and the remainder 18 degrees of phase modulation is devoted to synchronizing-pulse transmission; these figures are arbitrary, and may be changed as desired. Thus, the signal outputs of the video amplifiers of Red and Blue primary colors will vary within a predetermined limit of amplitude, whereas beyond this amplitude-limit, the pulses are derived by independent amplitude selecting circuits for synchronization and beam-blanking. The amplitude selecting circuits are not shown in the drawing, as they are conventionally employed in monochrome sets, and any one of the types is suitable for the purpose.

*Phase modulator of sync pulses*

Figure 5:
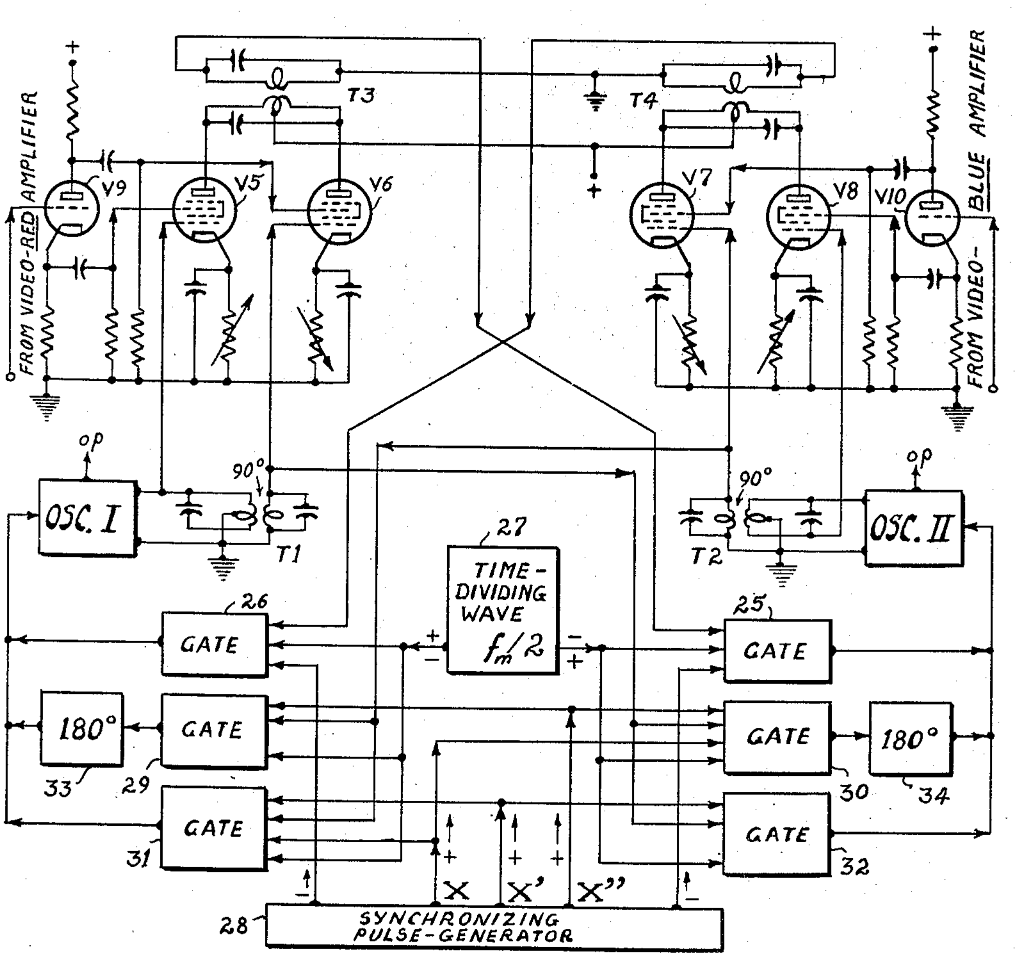
Fig. 5 illustrates partly a block diagram of the synchronizing signal modulator in connection with the transmitter in Fig. 2.

Fig. 5 is a modification of the block diagram in Fig. 2. In the arrangement of Fig. 5, only phase modulation is included for simplicity of drawing. The two oscillators of the carrier wave are represented by the blocks I and II. The outputs of these oscillators are split in phase 90 degrees by the transformers T1 and T2, and applied independently upon the control grids of phase modulator tubes V5, V6 and V7, V8. The cathode bias of modulator tube V6 is so adjusted that the tube normally operates at its maximum transconductance. Whereas, the cathode bias of tube V5 is so adjusted that the tube normally operates at its minimum transconductance; these adjustments being such that, the $G_m$ curve between maximum and minimum is substantially linear. Thus, the anode circuit of tube V6 normally contains maximum oscillatory current, and the anode of tube V5 normally contains minimum oscillatory current. The anode circuit, comprising transformer T3, further shifts the phase angle of the output wave 90 degrees, and applies upon the oscillator II, in the same phase angle as it originated in the oscillator I. When the positive video Red signal arrives at the control grid of cathode follower and phase inverter tube V9, the video signal is applied upon the second control grid of V5 in positive polarity, and upon the second control grid of V6 in negative polarity. In this manner, the transconductance of tube V5 is increased, and the transconductance of tube V6 is decreased, with the result that the phase angle of the oscillation I in transformer T3 is shifted forward in its application upon the oscillator II. Since as described in the foregoing, that the maximum phase shift allowed for signal modulation is 72 degrees, the minimum transconductance adjustments of V5 and V6 are substantially above zero, and the phase shift in the transformer T3 is other than 90°, so that with zero video-signal the oscillation I is applied upon the oscillator II in the same phase as it originates in oscillator I. The operation of phase modulator tubes V7 and V8 is similar to the operation of V5 and V6, and the output is applied upon the oscillator I in the same manner, and therefore, it needs no further explanation. In this case however, the video Blue phase modulated oscillation of II retards the phase angle of oscillator I, by reason of the inverted connection of transformer T2.

The output oscillation of oscillator I after being phase modulated by the Red video signals, it is applied upon the oscillator II, through gate 25, while the output oscillation of oscillator II after being phase modulated by the Blue video signals, it is applied upon the oscillator I, through gate 26. The gates 25 and 26 are operated in alternate time periods by the alternate positive half-cycle voltages of the time-dividing wave produced in block 27. For the video-signal modulation, the output of oscillator I (at *op*) contains periodic steady-state phase modulations representative of the video Blue signals, and the output of oscillator II (at *op*) contains periodic steady-state phase modulations representative of the video Red signals; in sequence with respect to each other.

Figure 6:
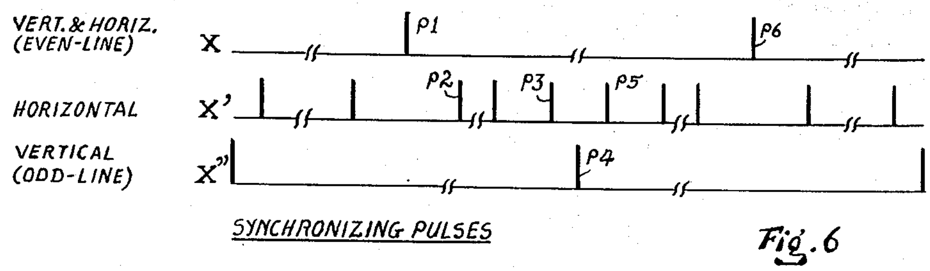
Fig. 6 illustrates the type of synchronizing pulses that are employed to phase modulate the carrier wave.

The synchronizing pulses are generated in positive polarity at the output terminals X, X' and X'' of block 28; in the form as shown in Fig. 6. Simultaneously with these pulses, there are produced pulses in negative polarity, as indicated at the extreme end terminals of block 28, which are applied upon the gates 25 and 26 to render them inoperative, and prevent the signal modulation from interfering with the pulse modulation. The gates 29, 30 and 31, 32 are normally rendered inoperative, and are so arranged that, they operate only when simultaneous positive voltages are applied upon, by the alternate positive half-cycle voltage of the time-dividing wave in block 27 and the positive pulse from the pulse generator 28. The output oscillation of oscillator I after being 90° phase-retarded by the transformer T1 is applied upon the inputs of gates 30 and 32 simultaneously, while the output oscillation of oscillator II after being 90° phase-retarded by the transformer T2 is applied upon the inputs of gates 29 and 31 simultaneously. The output voltages of gates 29 and 30 are phase inverted by the blocks 33 and 34, so that when the gates 29 and 30 are operated alternately by the simultaneous synchronizing positive-pulse from block 28 and alternate half-cycle positive-voltages from block 27, the oscillations of oscillators I and II will be advanced in phase by 90 degrees in every succeeding half-cycle periods of $f_m/2$. The outputs of gates 31 and 32 are applied in phase upon the oscillators I and II, so that when the latter gates are operated, this time the oscillations of oscillators I and II will be retarded in phase by 90 degrees in every succeeding alternate intervals of the wave $f_m/2$. If however, when the pulse generator applies a positive pulse upon gates 30 and 31 simultaneously, then the oscillation of oscillator II passing through gate 31 retards the phase angle of oscillation of I, and the oscillation of oscillator I passing through gate 30 advances the phase angle of oscillation of oscillator II; causing sequential phase-retarding and phase-advancing of the carrier wave from envelope to envelope. In this case, and with reference to the phase discriminator in Fig. 4, both the vertical and horizontal scannings are acted upon simultaneously, for even-line field scanning.

*Sequence of sync pulses*

The distribution sequence of horizontal and vertical pulses is shown in Fig. 6. At P1, both the vertical and horizontal pulses at X are present simultaneously (by way of cross-connection in the block diagram), for even lines. From this point on, the horizontal pulses P2 at X' continue. Between the last two pulses P3 and P5 of the even-line field, the vertical pulse P4 is produced at X''; for odd lines. From this point on the horizontal pulses continue, until at the last horizontal pulse P6, where both the horizontal and vertical pulses appear at X, for a new start of the even-lines.

The synchronizing pulse generator 28 is shown in block diagram, as pulse generators are commonly known and practiced in the television art, and the sequence of pulses may be obtained by known methods and circuitry.

While I have indicated in the foregoing specification that the type of synchronization described herein is intended to be used in conjunction with the type of video modulation employed in my above mentioned invention, it is obvious that other types of video modulation may also utilize the system. For example, the type of modulation described herein may be utilized in conjunction with the vestigial sideband transmission systems only during the transmission of sync pulses. The time period of each envelope may also be much longer than described in the foregoing. Similarly, the general principle of this invention indicates that, numerous substitutions of parts, adaptations and modifications are possible without departing from the spirit and scope thereof.

I claim:

1. In color television where amplitude modulation of the carrier wave is assigned to convey video signals of the first primary color continuously; phase modulation of the carrier to convey video signals of second and third primary colors sequentially, and where synchronization of the projected positions of elemental image components at the receiving end with that of the transmitting end is established by way of transmitting discrete signals distinguishable one from the other for the determination of time positions of the horizontal and vertical retracings, the system of transmitting discrete signals for the attainment of said synchronization which comprises: means to produce carrier oscillation in first and second channels, means to apply the output oscillations of the first and second channels upon each other's input oscillations periodically at a time-dividing frequency rate essential to convey video signals of any of the three primary colors, in a sense that, the output oscillation of each is capable of shifting the other's input oscillation to an in-phase relation periodically in sequence by force, means to shift the phase angle of the carrier oscillation periodically in the first and second channels in first or forward direction by video signals of the second primary color by representative angles limited to $x$, in those periodic intervals when one is shifting the other's phase angle, means to shift the phase angle of the carrier oscillation periodically in sequence with the second primary color in the said first and second channels in second or backward direction by video signals of the third primary color by representative angles limited to $x$, in the preceding manner, means to modulate the amplitude of the carrier oscillations in the first and second channels in alternate sequence at said time-dividing frequency rate by video signals of the first primary color, means to produce a first pulse at the time period when the horizontal scanning is to fly back for retrace, means to produce a second pulse when the vertical scanning is to fly back for retrace; namely for even-line field scanning, means to produce a third pulse when both the horizontal and vertical scannings are to fly back simultaneously for retrace; namely for odd-line scanning, means to shift the carrier phase by the first pulse in the first and second channels by a maximum angle X in the said first or forward direction in alternate sequence at the time-dividing frequency rate, means to shift the carrier phase by the second pulse in the first and second channels by a maximum angle X in the second or backward direction in alternate sequence in time phase with the last said modulation, means to shift the carrier phase by the third pulse in the first and second channels by a maximum angle X in the said first and second or forward and backward directions sequentially in alternate intervals of the time-dividing frequency, and means to combine those sequentially periodic portions of the output oscillations during which they proceed to shift the phase angle of the other's input oscillation, whereby in each time-division of the carrier or periodic thereof the carrier amplitude contains video information of the first primary color; the phase angle to a limit $x$ in the first or forward direction contains video information of the second primary color; the phase angle to a limit $x$ in the second or backward direction contains video information of the third primary color; the maximum phase angle X in the first or forward direction contains horizontal synchronizing information; the maximum phase angle X in the second or backward direction contains vertical synchronizing information; namely for even-line field scanning; and sequential maximum phase angles X in the first and second or forward and backward directions contain simultaneous horizontal and vertical synchronizing informations.

2. In time divided color television where amplitude modulation of the carrier wave is assigned to convey video signals of the first primary color continuously; phase modulation of the carrier wave by representative angles limited to $x$ to convey video signals of second and third primary colors sequentially, and where synchronizing signals are transmitted via phase modulation by a maximum angle X of the carrier wave, a phase modulating apparatus for the composite signals which comprises: first and second oscillators of substantially a single carrier-frequency, first and second phase modulators and first and second normally inoperative gates associated therewith, so cross-coupled between the first and second oscillators that, each oscillator after being phase modulated is capable of shifting the other's phase angle to an in-phase relation through its associated gate when operated, sources of video signals and means therefor to phase modulate the first and second oscillators independently in the first and second phase modulators by representative angles limited to $x$, a switching wave-source and means therefor to operate the first and second gates alternately by alternate positive voltages at a time-dividing frequency essential to convey video signals, whereby the first and second oscillators shift each other's phase angles in alternate sequence by representative angles limited to $x$, first and second phase-shifters and third and fourth normally inoperative gates associated therewith, so cross-coupled between the first and second oscillators that, each oscillator after passing through its respective phase-shifter and gate, when operated, shifts the other's phase angle by an angle X in backward direction, fifth and sixth gates and first and second 180° phase-inverters associated therewith, so cross-coupled between the first and second oscillators; in series with the said first and second phase-shifters that, each oscillator after passing through its respective phase-shifter; 180° phase-inverter; and gate when operated, shifts the other's phase by an angle X in forward direction, means to apply the switching wave in alternate positive polarities upon the third; fifth and fourth; sixth gates in such magnitudes that the gates are rendered just short of operation, means to produce a first pulse at the time when horizontal scanning is to fly back for retrace, means to produce a second pulse when vertical scanning is to fly back for retrace; namely for even-line field scanning, means to produce a third pulse when both the horizontal and vertical scannings are to fly back simultaneously for retrace; namely for odd-line scanning, means to apply the first pulse upon the third and fourth gates in positive polarity for operation; and simultaneously upon the first and second gates in negative polarity for non-operation, whereby the first and second oscillators shift each other's phases in continuous steps by angles X in backward direction representing horizontal synchronizing information, means to apply the second pulse upon the fifth and sixth gates in positive polarity for operation; and simultaneously upon the first and second gates in negative polarity for non-operation, whereby the first and second oscillators shift each other's phase angles in continuous steps by angles X in forward direction representing vertical synchronizing information, means to apply the third pulse upon odd gates, such as the third and fifth gates simultaneously in positive polarity for operation; and simultaneously upon the first and second gates in negative polarity for non-operation, whereby the first and second oscillators shift each other's phases by angles X in backward and forward directions in sequential steps representing simultaneous horizontal and vertical synchronizing informations, and means to combine the outputs of the first and second oscillators in the manner described for final transmission.

3. In color television where amplitude modulation of the carrier wave is assigned to convey video signals of the first primary color continuously, phase modulation of the carrier to convey video signals of second and third primary colors sequentially, and where synchronization of the projected positions of elemental image components at the receiving end with that of the transmitting end is established by way of transmitting discrete signals distinguishable one from the other for the determination of time positions of the horizontal and vertical retracings, the system of transmitting composite signals of synchronization and video components, all distinguishable one from the other, which comprises means for producing a carrier wave; time-dividing means and means therefor to time divide the carrier wave into elemental envelopes at a frequency rate equal to or higher than the highest frequency component contained in any one of the first, second or third primary colors; phase-shifting means and means therefor to shift the phase angle of the carrier wave from envelope to envelope in successive steps in first or forward direction by an angle X representative of the horizontal synchronizing signal, each of said successive steps being measurable from a preceding step, whereby each preceding step represents a reference angle to a succeeding step, for detection purposes; means for shifting phase angle of the carrier from envelope to envelope in aforesaid manner in second or backward direction by an angle X representative of the vertical synchronizing signal, namely for even-line retracing; means for shifting phase angle of the carrier in preceding manner alternately from envelope to envelope in first and second directions, representative of the vertical synchronizing signal, namely for odd-line retracing; means for shifting phase angle of the carrier in every second succeeding envelope, in aforesaid manner, in first or forward direction by angles limited to $x$ representative of video signals of the first primary color; means for shifting phase angle of the carrier in every other second succeeding envelope, in preceding manner in second or backward direction by angles limited to $x$ representative of video signals of the second primary color; amplitude modulator means and means therefor to shift the peak magnitudes of said carrier envelopes, in the manner described, representing video signals of the third primary color, whereby composite signals representing synchronization and video components are all distinguishable one from another; and means for transmitting the composite modulated carrier wave to the receiving end.

4. As set forth in claim 3, which includes in combination means for receiving said transmitted carrier wave; means for deriving first signal from said phase modulation X of the carrier in said first direction, for the control and operation of said horizontal retracing; means for deriving second signal from said phase modulation X of the carrier in said second direction, for the control and operation of said vertical retracing, namely for even-line retracing; means for deriving simultaneous first and second signals from said alternate forward and backward phase modulations X of the carrier, for simultaneous control and operation of said horizontal and vertical retracings, namely for odd-line retracing; means for deriving video signals representing the first primary color from said modulation $x$ in forward direction; means for deriving video signals representing the second primary color from said phase modulation $x$ in backward direction; and means for deriving video signals representing the third primary color from said amplitude modulation, for the control and operation of appropriate color-image reproducing device by said derived first, second and third video signals, thereby attaining said synchronization of video signals at the receiving end with that of the transmitting end.

MEGUER V. KALFAIAN.

References Cited in the file of this patent

UNITED STATES PATENTS

| Number | Name | Date |
|---|---|---|
| 2,546,972 | Chatterjea | Apr. 3, 1951 |